United States Patent [19]

Koll et al.

[11] 4,309,183
[45] Jan. 5, 1982

[54] LIQUID CRYSTAL PHASE OF AN AZO REACTIVE DYESTUFF AND ITS USE FOR DYEING AND PRINTING NATURAL AND SYNTHETIC SUBSTRATES

[75] Inventors: Jochen Koll, Odenthal; Volker Paulat, Monheim; Reinhold Hörnle, Cologne; Hans-Heinz Mölls; Konrad Nonn, both of Leverkusen, all of Fed. Rep. of Germany

[73] Assignee: Bayer Aktiengesellschaft, Leverkusen, Fed. Rep. of Germany

[21] Appl. No.: 208,592

[22] Filed: Nov. 19, 1980

[30] Foreign Application Priority Data

Nov. 30, 1979 [DE] Fed. Rep. of Germany ....... 2948291

[51] Int. Cl.³ .................... C09B 67/00; C09B 62/32; C09B 62/24
[52] U.S. Cl. ........................... 8/527; 8/437; 8/528; 8/549; 8/917; 8/918; 8/919; 260/154; 260/207.1; 544/356
[58] Field of Search ........... 8/528, 549, 527; 260/154; 544/356

[56] References Cited

U.S. PATENT DOCUMENTS 3,666,747 5/1972 Siegel et al. .................... 260/154

OTHER PUBLICATIONS

Hackh's Chemical Dictionary, Fourth Edition, (McGraw-Hil), 1972, p. 399.
John Griffiths' "Colour and Constitution of Organic Molecules" (Academic Press) 1976, p. 71.

Primary Examiner—A. Lionel Clingman
Attorney, Agent, or Firm—Sprung, Felfe, Horn, Lynch & Kramer

[57] ABSTRACT

Liquid finished formulations which are stable to storage and hydrolysis and are based on the lyotropic liquid crystal aqueous phase of the dyestuff of the formula

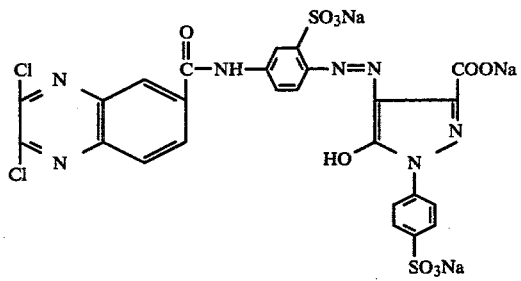

in water in a concentration of 12–35% at room temperature are outstandingly suitable for the preparation of dyebaths and printing pastes for dyeing cotton, wool, regenerated cellulose, paper and leather.

2 Claims, No Drawings

LIQUID CRYSTAL PHASE OF AN AZO REACTIVE DYESTUFF AND ITS USE FOR DYEING AND PRINTING NATURAL AND SYNTHETIC SUBSTRATES

The invention relates to the lyotropic liquid crystal aqueous phase of the dyestuff of the formula

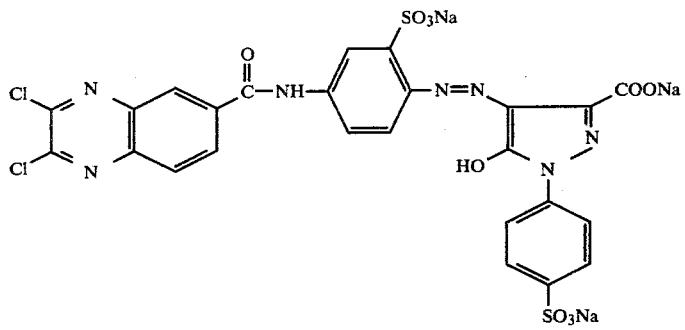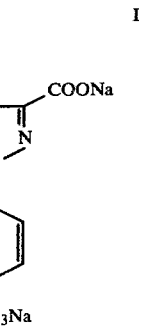

present in water in a concentration of 12–35% at room temperature, and the use of these lyotropic liquid crystals for the preparation of dyebaths and printing pastes for dyeing and/or printing natural and synthetic substrates, in particular cotton, wool, regenerated cellulose, paper and leather.

This phase exhibits the birefringence and formation of a structured diffraction pattern on small-angle X-ray diffraction which are characteristic of liquid crystals.

These lyotropic liquid crystals are characterised in the customary manner by the interference colours formed, as a result of birefringence, when these liquid crystals are inserted between crossed nicols in a polarisation microscope, and/or by the structured diffraction pattern on small-angle X-ray diffraction with Cu-Kα-radiation in a Kießig chamber (compare, for example, G. H. Brown: Flüssige Kristalle (Liquid Crystals); Chem. uns. Zeit, 2, 1968, pages 43–51 and Eckert and Kramer: Pharmazie uns. Zeit 1, 1972 (116–121)).

The liquid crystal phase is also retained when small amounts of inorganic salts, in particular sodium chloride, sodium sulphate or sodium acetate, or customary buffer mixtures and/or water-miscible organic solvents, such as alcohols, polyols, ethers or esters thereof or amides, and/or hydrotropic substances, such as urea, are added.

The physical form, according to the invention, of the dyestuff, is obtained when the almost salt-free dyestuff of the formula I is liquefied with water within the abovementioned concentration range. The new physical form can also be obtained directly if the aqueous solution or mixture which is obtained by the customary synthesis and has a high salt content is subjected to pressure permeation.

The new physical form, according to the invention, of the dyestuff is a liquid finished formulation which is exceptionally stable to storage and hydrolysis.

EXAMPLE 1

20 g of the completely salt-free or almost salt-free dyestuff of the formula I are liquefied with 80 g of water at room temperature in the course of several hours, whilst stirring.

A highly concentrated, lyotropic liquid crystal phase which is stable to storage and hydrolysis and which exhibits characteristic interference colours when inserted between crossed nicols in a polarisation microscope is obtained. When this phase is stirred into water and thickeners and the auxiliaries customary in the dyeing industry are added, a printing paste which can be used for printing natural and regenerated cellulose fibers in reddish-tinged yellow shades is obtained.

We claim:

1. Lyotropic liquid crystal phase of the dyestuff of the formula

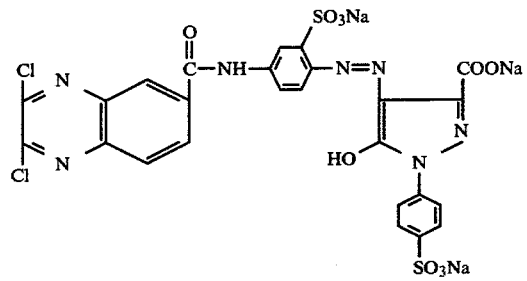

present in water in a concentration of 12–35% at room temperature.

2. A method for the preparation of dyebaths and printing pastes for dyeing and/or printing cotton, wool, regenerated cellulose, paper or leather which comprises using, as the dyestuff, the lyotropic liquid crystal phase of the dyestuff of claim 1.

* * * * *